United States Patent
Hsu et al.

(10) Patent No.: US 10,951,802 B2
(45) Date of Patent: Mar. 16, 2021

(54) CAMERA MODULE OF ELECTRONIC DEVICE

(71) Applicant: Chiun Mai Communication Systems, Inc., New Taipei (TW)

(72) Inventors: Wei-Hua Hsu, New Taipei (TW); Peng-Yu Chiu, New Taipei (TW); Ching-Chu Huang, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 0 days.

(21) Appl. No.: 16/546,577

(22) Filed: Aug. 21, 2019

(65) Prior Publication Data
US 2020/0068104 A1 Feb. 27, 2020

(30) Foreign Application Priority Data
Aug. 23, 2018 (CN) .......................... 201810966893.3

(51) Int. Cl.
*H04N 5/225* (2006.01)
*H04M 1/02* (2006.01)

(52) U.S. Cl.
CPC ......... *H04N 5/2257* (2013.01); *H04N 5/2253* (2013.01); *H04M 1/0264* (2013.01)

(58) Field of Classification Search
CPC ... H04N 5/2251–22541; H04N 5/2257; H04N 5/2258; H04M 1/026; H04M 1/0264; H04M 1/0249
See application file for complete search history.

(56) References Cited

U.S. PATENT DOCUMENTS

| 10,306,032 B2* | 5/2019 | Wei ...................... H04N 5/2257 |
| 2012/0086784 A1* | 4/2012 | Oh ........................ H04N 13/239 |
| | | 348/47 |
| 2014/0204538 A1* | 7/2014 | Choi ...................... G06F 1/1686 |
| | | 361/729 |
| 2016/0366313 A1* | 12/2016 | Chang .................. H04N 5/2258 |

FOREIGN PATENT DOCUMENTS

| CN | 103281488 A | 9/2013 |
| CN | 207283678   | 4/2018 |
| CN | 108174080   | 6/2018 |
| TW | M513520 U   | 12/2015 |

* cited by examiner

*Primary Examiner* — Lin Ye
*Assistant Examiner* — Chriss S Yoder, III
(74) *Attorney, Agent, or Firm* — ScienBiziP, P.C.

(57) ABSTRACT

A camera module includes multiple camera units, a bracket, and multiple mounting rods. Each of the camera units includes a main body and a lens on the main body. The main body includes two protrusions. The two protrusions protrude from opposite sides of the main body. Each of the two protrusions includes a fixing hole. The bracket is mounted in an electronic device and includes multiple mounting holes and multiple mounting grooves disposing in a surface of the bracket. Each two of the multiple mounting grooves connect with corresponding mounting holes at opposite sides of the mounting holes. The mounting rods protrude from the mounting grooves. When the mounting holes receive the camera units, the corresponding mounting grooves receive the corresponding protrusions and the mounting rods pass through the corresponding fixing holes.

15 Claims, 4 Drawing Sheets

CAMERA MODULE OF ELECTRONIC DEVICE

FIELD

The subject matter herein generally relates to electronic devices, and more particularly to a camera module of an electronic device.

BACKGROUND

As electronic devices become smaller in size, components within the electronic device are packed more densely. Thus, the components require to be accurately positioned with simplified structures. In particular, multiple cameras of the electronic device require to be accurately positioned with more simplified structures.

BRIEF DESCRIPTION OF THE DRAWINGS

Implementations of the present disclosure will now be described, by way of example only, with reference to the attached figures.

DETAILED DESCRIPTION

Figure 1:
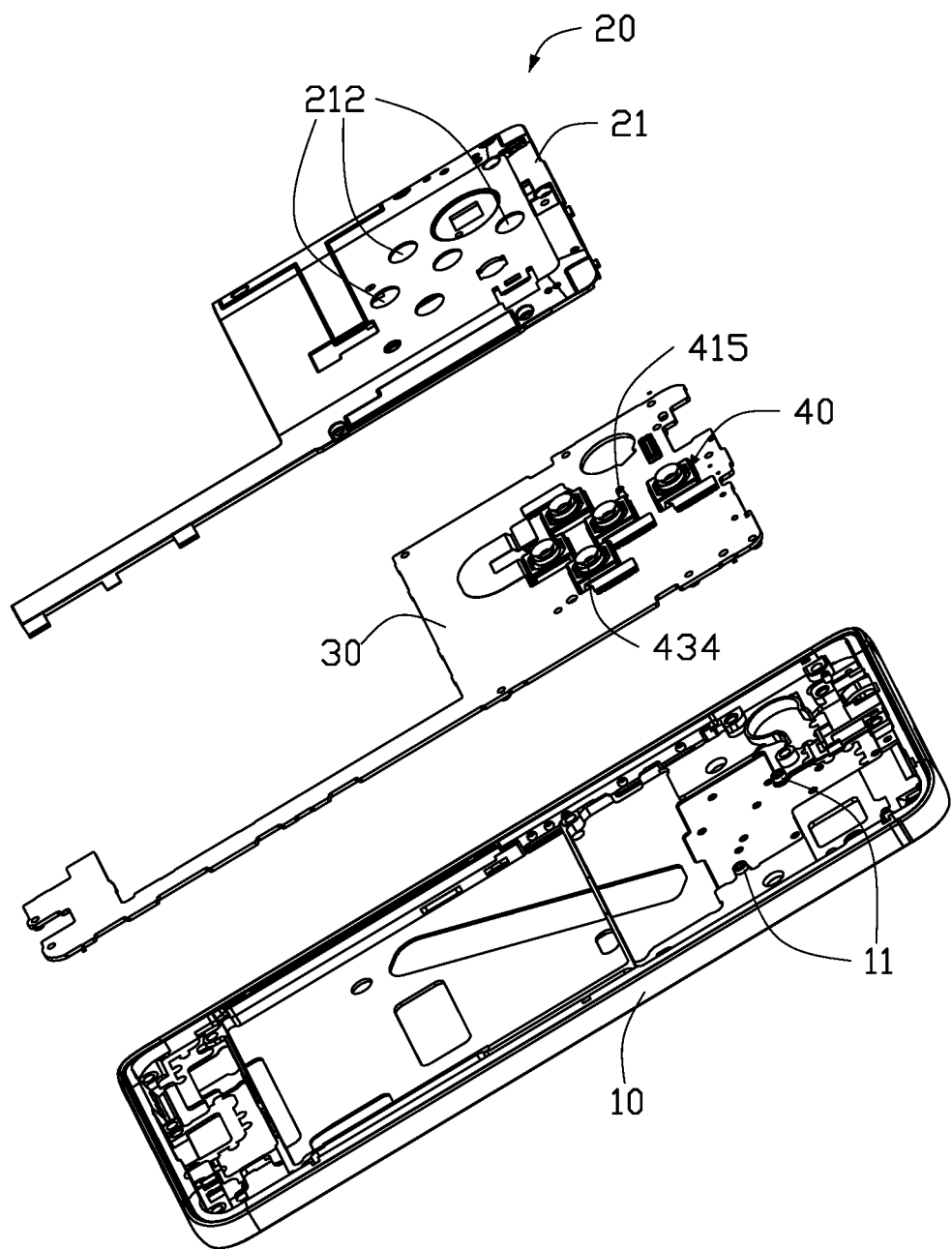
FIG. 1 is an exploded, isometric view of an electronic device including a camera module in accordance with an embodiment of the present disclosure.

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape, or other word that "substantially" modifies, such that the component need not be exact. For example, "substantially cylindrical" means that the object resembles a cylinder, but can have one or more deviations from a true cylinder. The term "comprising" means "including, but not necessarily limited to"; it specifically indicates open-ended inclusion or membership in a so-described combination, group, series and the like.

Figure 2:
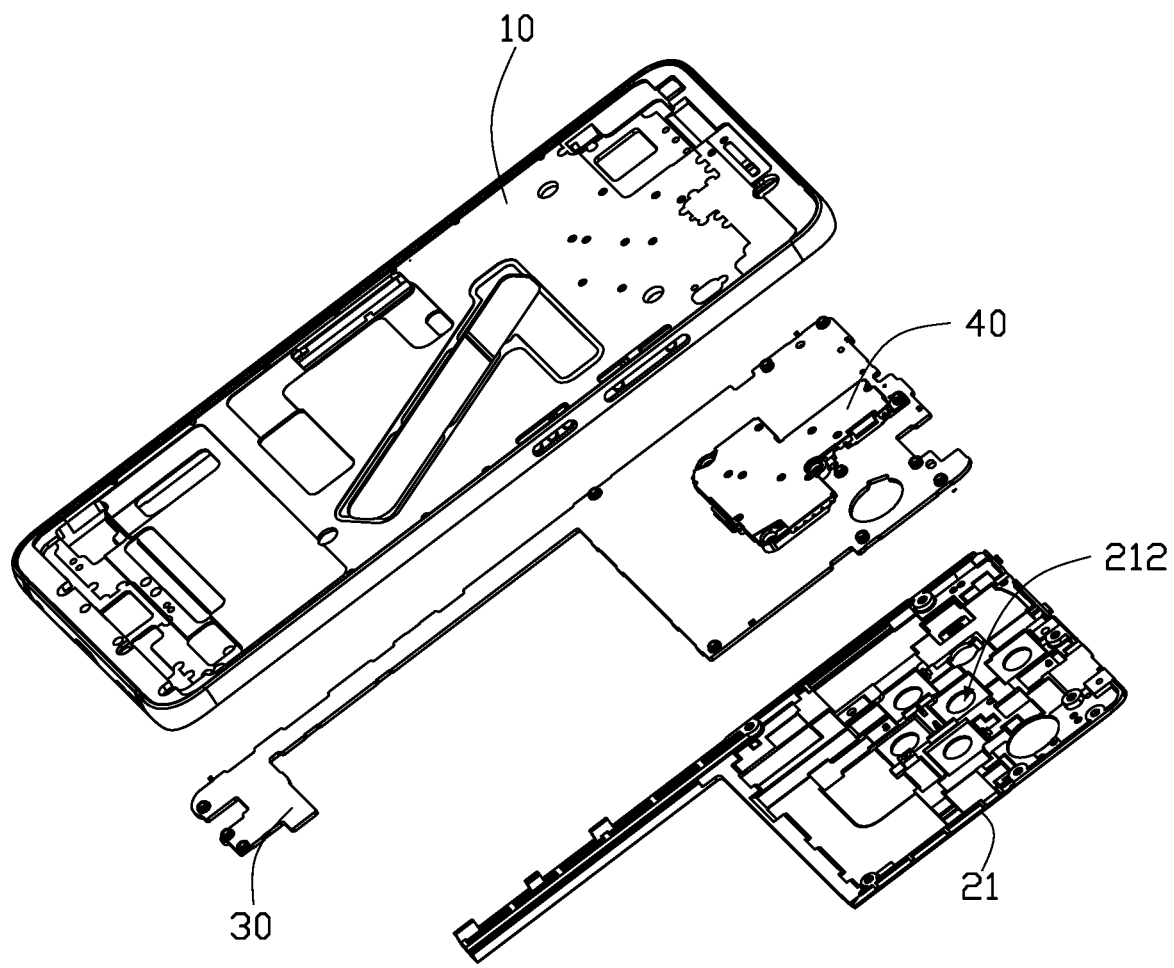
FIG. 2 is similar to FIG. 1, but shows the electronic device from another angle.

FIG. 1 and FIG. 2 show an embodiment of an electronic device 100 including a middle frame 10, a back cover 20, a circuit board 30, and a camera module 40. The back cover 20 is covered over the middle frame 10. The circuit board 30 is mounted between the middle frame 10 and the back cover 20. The camera module 40 is mounted to the circuit board 30 and partially passes through the back cover 20 to take pictures. In one embodiment, the electronic device 100 is a mobile phone. In other embodiment, the electronic device 100 may be a tablet computer or the like.

In one embodiment, the back cover 20 includes an inner cover 21 and a rear cover (not shown). A shape of the inner cover 21 matches a shape of the circuit board 30. The circuit board 30 is mounted between the inner cover 21 and the middle frame 10 by a plurality of mounting members (not shown), such as screws. The inner cover 21 defines a plurality of openings 212 through which the camera module 40 passes through. The middle frame 10, the inner cover 21, and the rear cover may be mounted together by an adhesive, solder, or locking structure.

Figure 3:
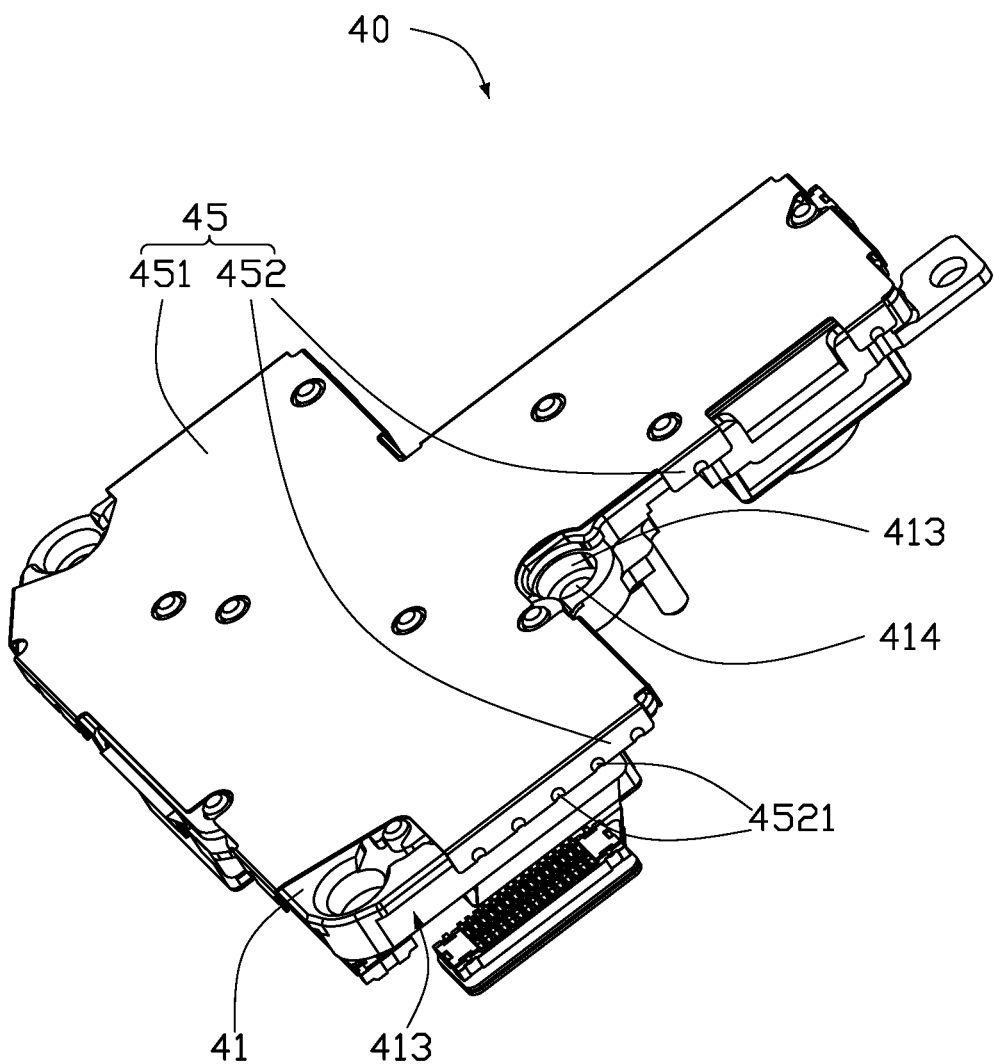
FIG. 3 is an isometric view of the camera module in FIG. 1.
Figure 4:
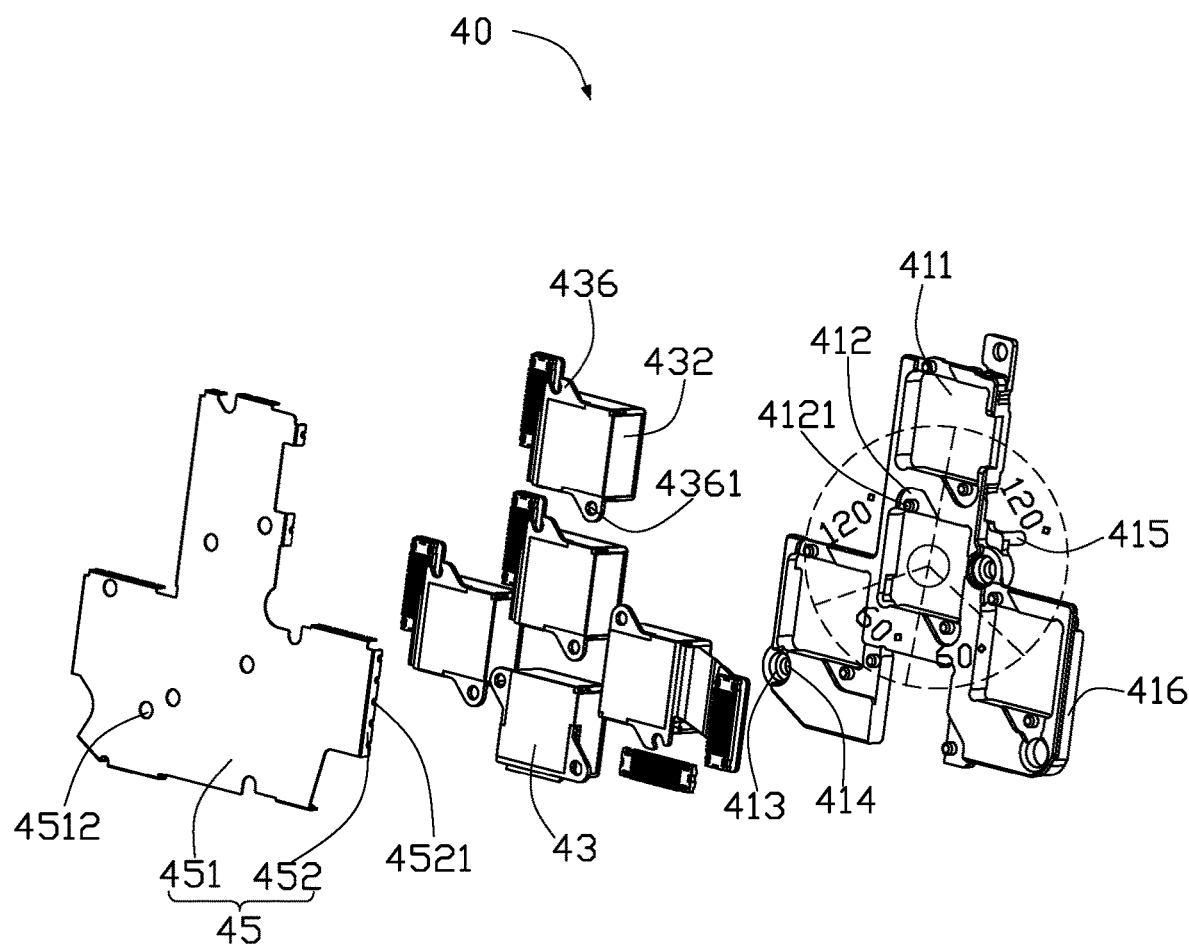
FIG. 4 is an exploded view of the camera module in FIG. 3

FIG. 3 and FIG. 4 show the camera module 40 including a bracket 41, multiple camera units 43, and a cover plate 45. The bracket 41 mounts the camera units 43 to the circuit board 30. The cover plate 45 is covered over the bracket 41 and abuts a side of the camera units 43 opposite to the circuit board 30.

In one embodiment, a quantity of the camera units 43 is five, but is not limited to five. Each of the camera units 43 includes a main body 432 and a lens 434 (shown in FIG. 1). The lens 434 is mounted to the main body 432. The main body 432 is mounted to the bracket 41. The bracket 41 is mounted to a side of the circuit board 30 facing the middle frame 10. The main body 432 passes through the circuit board 30 and abuts the inner cover 21. The lens 434 passes through the circuit board 30, the inner cover 21, and the rear cover in sequence.

In one embodiment, the main body 432 is substantially rectangular. The main body 432 includes two protrusions 436. The two protrusions 436 protrude from opposite sides of the main body 432 and are positioned at opposite corners of the main body 432. Each of the two protrusions 436 includes a fixing hole 4361.

The bracket 41 is substantially rectangular. The bracket 41 includes five mounting holes 411. Each mounting hole 411 receives a corresponding one of the main bodies 432. A shape of each mounting hole 411 matches a shape of the main bodies 432. The bracket 41 includes ten mounting grooves 412 disposing in a surface of the bracket 41 facing away from the circuit board 30. Each mounting groove 412 is a depression. Each two of the multiple mounting grooves 412 connect with corresponding mounting holes 411 at opposite sides of the mounting holes 411. The two corresponding mounting grooves 412 correspond to the two protrusions 436 of the corresponding main body 432. Multiple mounting rods 4121 protrude from the mounting grooves 412 When the mounting holes 411 receive the camera units 43, the corresponding mounting grooves 412 receive the corresponding protrusions 436 and the mounting rods 4121 pass through the corresponding fixing holes 4361.

In another embodiment, a cross-sectional shape of the main body 432 may be other shapes, as long as the shape of the mounting hole 411 matches the shape of the main body 432.

In one embodiment, four of the five mounting holes 411 are peripheral mounting holes, and the centers of the four peripheral mounting holes are positioned on an arc of a schematic circle centered on the fifth mounting hole 411.

Angles defined by the center points of two adjacent mounting holes 411 of the four mounting holes 411 are 60 degrees, 60 degrees, 120 degrees, and 120 degrees. In other embodiments, arrangement of the mounting holes 411 may be changed according to requirements.

In one embodiment, one of the four peripheral mounting holes extends through the sidewall of the bracket 41, and the multiple camera units 43 electrically couple to the circuit board 30 through the sidewall of the bracket 41. In other embodiments, more than one of the mounting holes may further extend through a sidewall of the bracket 41, or none of the mounting holes may extend through the sidewall of the bracket 41, as long as the camera modules 43 are electrically coupled to the circuit board 30 sufficiently without interfering with other components.

In one embodiment, the bracket 41 further includes multiple positioning slots 413. The middle frame 10 includes multiple positioning blocks 11. The bracket 41 is mounted to the middle frame 10 by the positioning slot 413 receiving the positioning block 11. In one embodiment, a quantity of the positioning slot 413 and the positioning block 11 is each two.

In one embodiment, the bracket 41 and the middle frame 10 are positioned by screws (not shown). The two positioning slots 413 form threaded holes 414 for receiving the screws to position the bracket 41 and the middle frame 10. In other embodiments, the bracket 41 and the middle frame 10 may be positioned by other means, such as by soldering, for example.

In one embodiment, a side of the bracket 41 facing the circuit board 30 includes a limiting rod 415. The limiting rod 415 is received through a limiting hole (not shown) of the circuit board 30 to position the bracket 41 to the circuit board 30. In other embodiments, the limiting rod 415 may be omitted and the bracket 41 is mounted to the circuit board 30 by other means.

In one embodiment, the bracket 41 includes a groove 416 disposing in a sidewall of the bracket 41.

The cover plate 45 includes a main portion 451 and multiple side plates 452 extending from the main portion 451. An outline of the main portion 451 matches an outline of the bracket 41. The main portion 451 is covered over the bracket 41 to clamp the camera units 43 between the main portion 451 and the inner cover 21. The multiple side plates 452 include multiple recesses 4521. In one embodiment, the recessed portions 4521 are defined by stamping. When the cover plate 45 mount to the bracket 41, the multiple recesses 4521 fit into the groove 416.

In one embodiment, the main portion 451 includes multiple positioning holes 4512. The mounting rods 4121 of the bracket 41 pass through the corresponding fixing holes 4361 within the corresponding positioning holes 4512 to position the cover plate 45.

In other embodiments, the cover plate 45 may be omitted, such that the middle frame 10 is directly pressed to mount the camera units 43.

In assembly of the electronic device 100, each camera unit 43 is mounted within the corresponding mounting hole 411. The mounting grooves 412 receive the protrusions 436, and the mounting rods 4121 are received within the corresponding fixing holes 4361 to mount the camera units 43. Then, the main portion 451 of the cover plate 45 is covered over the bracket 41 and the camera units 43, and the mounting rods 4121 are received within the corresponding positioning holes 4512 to mount the cover plate 45. The recessed portions 4521 are clipped within the groove 416 to finish mounting the cover plate 45. Then, the camera module 40 is mounted to the circuit board 30 by the limiting rod 415 being received by the circuit board 30. Finally, the middle frame 10 is mounted to the bracket 41 by the positioning slot 413 and the positioning block 11, and the middle frame 10, the circuit board 30, and the inner cover 21 are mounted together by the plurality of mounting members, such as screws.

The electronic device 100 described above uses the bracket 41 to mount the plurality of camera units 43. The bracket 41 defines the mounting holes 411 and the mounting grooves 412. Each mounting groove 412 includes a mounting rod 4121. The main body 432 of the camera unit 43 is mounted within the mounting hole 411. The protrusions 436 of the camera unit 43 are mounted within the corresponding mounting grooves 412. The bracket 41 has a structure that accurately positions the camera units 43.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A camera module comprising:
multiple camera units, each of the multiple camera units including a main body and a lens on the main body, the main body comprising two protrusions, the two protrusions protruding from opposite sides of the main body, each of the two protrusions comprising a fixing hole;
a bracket mounted in an electronic device and including multiple mounting holes and multiple mounting grooves disposing in a surface of the bracket, wherein each two of the multiple mounting grooves connect with corresponding mounting holes at opposite sides of the mounting holes; and
multiple mounting rods protruding from the mounting grooves,
wherein when the mounting holes receive the camera units, the corresponding mounting grooves receive the corresponding protrusions and the mounting rods pass through the corresponding fixing holes.

2. The camera module of claim 1, wherein the camera module further comprises a cover plate covering the bracket and abut a side of the camera units opposite the bracket.

3. The camera module of claim 2, wherein:
the bracket comprises a groove disposing in a sidewall;
the cover plate comprises a main portion and multiple side plates extending from the main portion; and
the multiple side plates comprises multiple recesses,
wherein when the cover plate mount to the bracket, the multiple recesses fit into the groove.

4. The camera module of claim 3, wherein:
the main portion comprises multiple positioning holes, wherein the mounting rods pass through the corresponding fixing holes within the corresponding positioning holes to position the cover plate.

5. The camera module of claim 1, wherein:
a quantity of the plurality of camera units is five;
a quantity of the plurality of mounting holes of the bracket is five, the centers of four of the mounting holes are positioned on an arc of a schematic circle centered on another mounting hole; and a quantity of the plurality of mounting grooves of the bracket is ten.

6. The camera module of claim 1, wherein:
at least one of the multiple mounting holes extends through the sidewall of the bracket; and
the multiple camera units electrically couple to a circuit board of an electronic device through the sidewall of the bracket.

7. An electronic device comprising:
a middle frame;
a back cover;
a circuit board; and
a camera module mounted on a side of the circuit board facing the middle frame, the camera module comprising:
  a plurality of camera units, each of the plurality of camera units comprising a main body and a lens on the main body, the main body comprising two protrusions, each of the two protrusions protruding from a side of the main body, the two protrusions are at opposite corners of the main body, each of the two protrusions comprising a fixing hole; and
  a bracket mounted in an electronic device and defining a plurality of mounting holes, a plurality of mounting grooves defined in a surface of one side of the bracket, wherein each of the plurality of mounting grooves is in communication with a corresponding one of the mounting holes, each of the plurality of mounting holes is in communication with corresponding two of the mounting grooves, each corresponding two mounting grooves positioned at opposite corners of the mounting hole, a mounting rod protruding from each of the mounting groove, each mounting hole receives a corresponding camera unit, each corresponding two mounting grooves receive the corresponding protrusions, and the mounting rods are received through corresponding fixing holes.

8. The electronic device of claim 7, wherein the camera module further comprises a cover plate covering the bracket and abut a side of the camera units opposite the bracket.

9. The electronic device of claim 8, wherein:
a groove is defined in a sidewall of the bracket;
the cover plate comprises a main portion and a plurality of side plates, each of the side plates extending continuously from the main portion; and
each of the side plates comprises a plurality of recessed portions, the cover plate is mounted to the bracket by each of the side plates clipping into the groove of the bracket.

10. The electronic device of claim 9, wherein:
the main portion defines a plurality of positioning holes; and
the mounting rods received through the fixing holes are received within the corresponding positioning holes to position the cover plate.

11. The electronic device of claim 7, wherein:
a quantity of the plurality of camera units is five;
a quantity of the plurality of mounting holes of the bracket is five;
a quantity of the plurality of mounting grooves of the bracket is ten; and
centers of a first four of the mounting holes are positioned on a arc of a schematic circle centered by a center point of a fifth one of the mounting holes.

12. The electronic device of claim 7, wherein:
at least one of the plurality of mounting holes further extends through a sidewall of the bracket; and
each of the plurality of camera units is adapted to be electrically coupled to a circuit board of an electronic device through the sidewall of the bracket.

13. The electronic device of claim 7, wherein the bracket comprises a limiting rod adapted to position the bracket to the circuit board.

14. The electronic device of claim 7, wherein the bracket further comprises multiple positioning slots; and the middle frame comprises multiple positioning blocks, wherein the positioning blocks are received within the positioning slots to mount the bracket to the middle frame.

15. The electronic device of claim 14, wherein each positioning slot forms a threaded hole configured to receive a screw to position the bracket and the middle frame.

* * * * *